United States Patent Office 2,905,651
Patented Sept. 22, 1959

2,905,651

VINYLIDENE RESIN COMPOSITIONS PLASTICIZED WITH DIBENZYL ESTERS OF DICARBOXYLIC ACIDS AND PROCESS OF EXTRUDING

Robert J. Reid, Canal Fulton, William Mayo Smith, Jr., Cuyahoga Falls, and Byron H. Werner, Akron, Ohio, assignors to The Firestone Tire & Rubber Company, Akron, Ohio, a corporation of Ohio No Drawing. Application February 23, 1954
Serial No. 412,077

12 Claims. (Cl. 260—31.8)

This invention relates to the use of dibenzyl esters of dicarboxylic acids as plasticizers in the hot melt extrusion of crystalline homopolymers of vinylidene chloride and copolymers of vinylidene chloride and up to 15 percent of vinyl chloride.

These crystalline polymeric resins have been known for some time. They have been used to a substantial extent in the manufacture of films and filaments for various purposes, but the extrusion has presented various difficulties. The high temperatures necessary for processing are very close to the decomposition temperature of the composition. Therefore, it is essential that some additive be used which will lower the processing temperature below the critical range without having any undesirable effect on the products obtained.

Such resins are characterized by crystalline behavior, i.e., they fuse sharply to form relatively fluid melts. On quenching and orienting, the extruded filaments and films are crystalline in character. A syndrome of this crystalline habit is the recalcitrance of these resins to compounding: The macromolecules of these resins prefer contact with each other and tend to reject any foreign substances such as plasticizers and the like. In the random structure obtained without orientation any added ingredient of limited compatibility, such as the plasticizers of this invention, is retained in larger percentages than is possible in the stretched or oriented products. On stretching, the tendency toward exudation or spewing is considerably increased. In orienting films and filaments of vinylidene resins they are stretched to several times their original length, and ordinarily until there is a sharp rise in the modulus. It is difficult to provide suitable plasticizers which do not exhibit an undesirable spew or bloom on the surface of the oriented products and which in addition possess good heat and light stability or which at least are not detrimental to such stability.

Thus, the problem of providing plasticizers for these crystalline resins is complicated not only by the fact that they tend to reject and spew the majority of conventional plasticizers, but, because the resins are extruded as hot melts at temperatures in the neighborhood of, for example 170° C., many conventional resin-compounding ingredients tend to decompose or react with other compounding ingredients which are present when the resins are maintained in a molten state immediately prior to and during extrusion.

The crystalline resins to which the plasticizers of this invention are added include both homopolymers of vinylidene chloride and copolymers thereof with not more than substantially 15 percent of vinyl chloride. The copolymers contain at least substantially 85 percent of vinylidene chloride.

These plasticizers have excellent light stability and good heat stability as well as good spew resistance. They are non-toxic, non-allergenic, and relatively odorless. In addition, they do not appreciably increase the tendency of oriented films or filaments to shrink when exposed to elevated temperatures.

Compounding and testing

With regard to the use of the plasticizers, an amount in the range of 8 percent to 10 percent based on the weight of the resin will generally be found most satisfactory. Such percentages will be stably retained within the resin in the finished oriented article. The esters of the lower molecular weight dicarboxylic acids show a lesser tendency to spew (greater compatibility with the resin) than the esters of the higher molecular weight acids. In no case will more than about 10 percent of the plasticizer be employed in a vinylidene resin because such larger amounts are incompatible and exude to the surface of oriented products produced from vinylidene polymeric resins containing 85 percent or more of vinylidene chloride.

The dibenzyl esters of dicarboxylic acids can be employed with the epoxy heat stabilizers such as glycidylphenylether, the mono-, di-, tri-, tetra-, and penta-chlorinated derivatives of phenoxy-propene oxide, polymeric phenoxy compounds prepared from various dihydroxy phenols and epichlorhydrin, etc. Likewise, they can be employed with the salicylate ester light stabilizers such as phenyl salicylate, 4-tert-butylphenyl salicylate, 4-octyl phenyl salicylate, 2-methyl phenyl salicylate, 4-chloro phenyl salicylate, 3-methyl phenyl salicylate, 4-t-amyl phenyl salicylate, 4-nonyl phenyl salicylate, 2-octyl-4-methyl salicylate, 2-isopropyl salicylate, nonyl salicylate, ethylhexy salicylate, n-butyl salicylate, etc.

The dibenzyl esters of dicarboxylic acids may be used in extrusions of the resins of this invention employing a variety of different formulae. They all impart desirable extrusion properties to the resins and are retained in the extruded, oriented products. They have no adverse effect on light or heat stability, and may actually assist in their action.

Test data was compiled from compositions both with and without light and heat stabilizers according to the following formulations:

| | Parts by weight |
|---|---|
| Crystalline resinous copolymer of vinylidene chloride and vinyl chloride (85:15) | 100 |
| Glycidyl phenyl ether | 0 or 2 |
| 4-t-butyl phenyl salicylate | 0 or 2 |
| Dibenzyl dicarboxylate | 8 |

The additives were ball milled with the resin, and samples tested for heat stability, light stability, and spew according to the methods given below.

Heat stability

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was—

(1) Heat for three minutes with steam at 120 lbs./sq. in. and mold pressure of 1000 lbs./sq. in.;

(2) Water cool for two minutes under 1000 lbs./sq. in. mold pressure; and (3) Eject from the press.

The resultant cylindrical button (1.25 inches in diameter and .125–.188 inch in height) was then cut into sector-shaped specimens which were placed in a forced-draft oven at 180° C. Specimens were removed at intervals of 10, 20, and 30 minutes after placing in the oven, and the behavior of the specimens on the test as a whole was rated by the operator.

Light stability

One gram samples of the compositions to be tested were placed between Cellophane (regenerated cellulose) sheets and pressed in a flat platen laboratory press under a total of 1000 lbs. at a temperature of 180° C., yielding a plaque approximately 6 to 8 mils thick. The plaques were tested according to the method of ASTM test D620–45T under a sunlamp for 240 hours.

Plaques were also tested in a weatherometer for 100 hours, and 200 hours. The weatherometer was a standard X–1–A machine, using a Corex D filter and operating without the sprays.

Spew rating

A plaque of the compounded resin was pressed between Cellophane (regenerated cellulose) sheets in a Carver press at 180° C., using approximately 1.5 grams of resin, 10 seconds preheat, and 15 seconds with the minimum pressure (pressure indicator just off zero). The plaque was quenched in cold water immediately and an approximately 3/8 inch wide strip was cut from the plaque, the cellophane removed, and the strip oriented to its limit.

The oriented strips were placed in glassine bags under mild pressure so that contact of the strips with the bag was assured. Any exudation of plasticizer could then be noted as an oily streak on the glassine. Tests were carried out at room temperature and at 50° C., the latter condition tending to accentuate any migration of plasticizer.

Using the dibenzyl esters of this invention, no spew was observed in this test after 56 days at room temperature. With dioctyl phthalate instead of a dibenzyl dicarboxylate, definite spew occurred after one day.

Test results

In the test 4.5 parts of each of several dibenzyl carboxylates were employed separately with 2 parts glycidylphenyl ether and 2 parts 4-t-butylphenyl salicylate in 100 parts of vinylidene chloride-vinyl chloride copolymer (85:15). The resin containing the dibenzyl oxalate showed fair resistance to heat. The resins containing dibenzyl succinate and dibenzyl adipate showed good heat resistance. The heat resistance of the resin containing dibenzyl sebacate was rated excellent. All of the resins showed good heat resistance and good freedom from spew. From the standpoint of availability as well as performance, dibenzyl succinate and dibenzyl adipate are selected as preferred.

The resins referred to herein are homopolymers of vinylidene chloride and copolymers thereof with up to 15 percent of vinyl chloride. Increasing the vinyl chloride content of a resin gives polymeric products in which plasticizers generally are more compatible. The comment herein relative to spew is to be considered in the light of the fact that homopolymers of vinylidene chloride are somewhat less compatible with the esters than copolymers containing as much as 15 percent of vinyl chloride.

Extrusion

Tests were conducted using various plasticizers with 4 to 8 parts by weight of the plasticizer, together with 2 parts glydicyl phenyl ether and 2 parts phenyl salicylate as light and heat stabilizers. The extrusions were carried out in conventional screw-type machines, the molten polymer being forced through dies to form filaments which were then quenched by passage through a water bath and cold-drawn some 400 percent by passage over differential speed rolls.

It was observed that with as little as four parts of dibenzyl succinate or dibenzyl sebacate, for example, smooth filaments were produced readily in gauges from .006 inch to .015 inch without heat degradation. These filaments exhibited no exudation of processing aid on storage and possessed excellent light stability when exposed to Florida sunshine. They had good heat stability. Extrusions carried out with conventional plasticizers such as di-octylphthalate required at least 8 parts plasticizer to give desirable extrusion characteristics and the filaments on storage in all cases exuded the plasticizer.

The plasticizers of this invention lower the melt temperature of the resin, allowing extrusions to take place without decomposition. The extruded products were smooth and of uniform diameter, and were free of spew after orientation.

What we claim is:

1. The process of extruding and orienting a resin selected from the group consisting of homopolymers of vinylidene chloride and copolymers thereof with up to 15 percent by weight (based on the weight of said copolymers) of vinyl chloride copolymerized therewith, the improvement which comprises including alone as a plasticizer in the molten resin substantially 8 to 10 percent by weight (based on the weight of the resin) of the dibenzyl ester of a saturated aliphatic dicarboxylic acid containing 2 to 10 carbon atoms.

2. The process of claim 1 in which the ester used is dibenzyl succinate.

3. The process of claim 1 in which the ester used is dibenzyl adipate.

4. The process of claim 1 in which an epoxy heat stabilizer and a salicylate ester light stabilizer are used in the molten resin.

5. An oriented resin composition which includes a resin selected from the group consisting of homopolymers of vinylidene chloride and copolymers thereof with up to 15 percent by weight (based on the weight of the resin) of vinyl chloride copolymerized therewith, and substantially 8 to 10 percent by weight (based on the weight of the resin) of the dibenzyl ester of a saturated aliphatic dicarboxylic acid containing 2 to 10 carbon atoms as a plasticizer and the sole plasticizer therefor.

6. The resin composition of claim 5 in which the plasticizer is dibenzyl succinate.

7. The resin composition of claim 5 in which the plasticizer is dibenzyl adipate.

8. The resin ccmposition of claim 5 which contains an epoxy heat stabilizer and a salicylate ester light stabilizer.

9. An oriented resin composition which includes a copolymer composed of substantially 85 percent vinylidene chloride and 15 percent vinyl chloride, and substantially 8 to 10 per cent by weight (based on the weight of the copolymer) of the dibenzyl ester of a saturated aliphatic dicarboxylic acid containing 2 to 10 carbon atoms as a plasticizer and as the sole plasticizer therefor.

10. The resin composition of claim 9 in which the plasticizer is dibenzyl succinate.

11. The resin composition of claim 9 in which the plasticizer is dibenzyl adipate.

12. The resin composition of claim 9 which contains an epoxy heat stabilizer and a salicylate ester light stabilizer.

References Cited in the file of this patent
UNITED STATES PATENTS

| | | |
|---|---|---|
| 2,477,610 | Irons | Aug. 2, 1949 |
| 2,498,453 | Schaerer | Feb. 21, 1950 |
| 2,755,262 | Dilke | July 17, 1956 |

OTHER REFERENCES

Buttrey: Plasticizers, Interscience Publishers Inc., New York, 1950, page 62.